Patented Nov. 6, 1923.

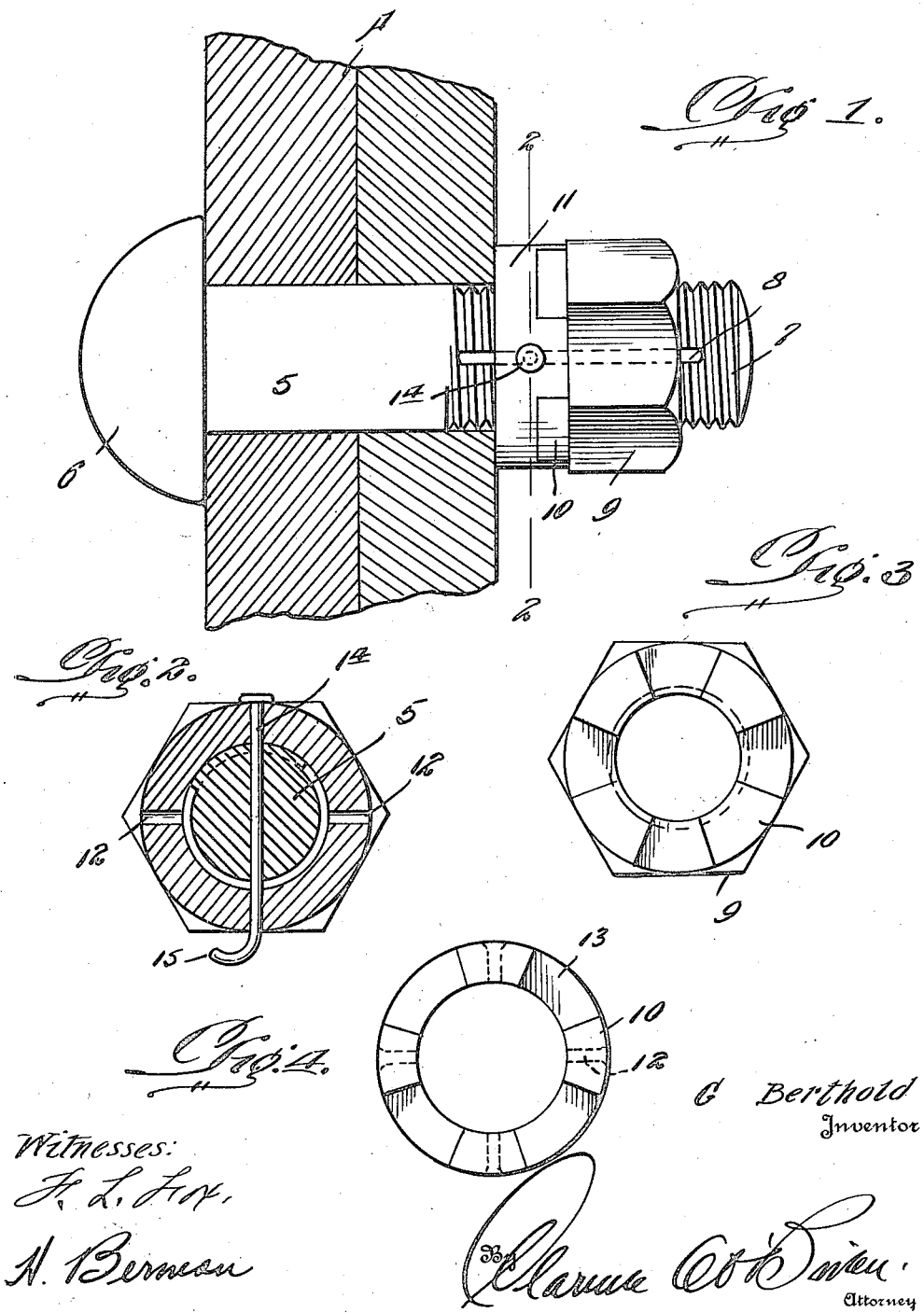

1,473,170

UNITED STATES PATENT OFFICE.

GEORGE BERTHOLD, OF BRIDGEVILLE, PENNSYLVANIA.

NUT LOCK.

Application filed February 27, 1923. Serial No. 621,509.

*To all whom it may concern:*

Be it known that I, GEORGE BERTHOLD, a citizen of the United States, residing at Bridgeville, in the county of Allegheny and State of Pennsylvania, have invented certain new and useful Improvements in Nut Locks, of which the following is a specification.

My invention relates to improvements in nut locks, the primary object thereof residing in the provision of such a nut lock that is substantially simple of construction, and highly efficient in its operation, the same being well adapted to maintain the nut in a locked position upon the bolt until the same is forcibly removed therefrom.

The nature and advantages of the invention will be better understood when the following detailed description is read in connection with the accompanying drawing, the invention residing in the construction, combination, and arrangement of parts as claimed.

In the drawing forming part of this application, like numerals of reference indicate similar parts in the several views, and wherein:

Figure 1 is an elevational view of a bolt and nut, together with my improved locking means, the same being shown in position to maintain two plate members in face to face contact with each other.

Figure 2 is a vertical detail cross sectional view upon the line 2—2 of Figure 1.

Figure 3 is an elevational view of one of the nut faces, and

Figure 4 is a similar view of the adjacent face of the lock washer, which forms a component part of my invention.

Referring to the drawing in detail, A designates a pair of plate members having alined openings therein, for the reception of a bolt for maintaining the same in face to face contact with each other.

5 designates the bolt headed at one end as at 6, and screw threaded at its opposite end as at 7. Within the screw threaded portion of the bolt is a relatively elongated slot 8.

9 designates a nut, the inner face of which is formed with spaced projecting studs 10. 11 designates a relatively thick washer adapted for loosely positioning over the bolt 5, and having alined openings 12, formed upon opposite sides thereof. The face of the said washer 11 adjacent to the studded face of the said nut 9 is formed with spaced notches 13, for the reception of the said studs 10 of the nut.

In the practical application of my device, the bolt 5 is inserted through the said openings in the said pair of plates A, after which the washer 11 is disposed upon the screw threaded end of the bolt, together with the nut 9. After engaging the studs 10 within the socket 13 of the washer 11, the nut is rotated upon the bolt, until the washer is tightly wedged against the adjacent one of the plates A, at which time, a locking pin 14 is extended between certain ones of the openings 12 within the washer 11, as well as through the said slot 8 in the bolt 5. This pin will effectively prevent a turning movement of the nut and washer in a reverse direction, and this pin after being applied is preferably bent upwardly at its lower end as at 15, to prevent casual removal of the same.

In view of the above description, it will at once be apparent that I have provided a nut lock that is a substantial improvement over the art, and although I have herein shown and described the preferred embodiment of the present invention, it is nevertheless to be understood that minor changes may be made therein, without departing from the spirit and scope of the invention as claimed.

Having thus described my invention, what I claim as new, and desire to secure by Letters-Patent is:—

1. In an article of the class described, a bolt headed at one end and screw threaded at its opposite end, said screw threaded end being formed with a relatively elongated slot, a washer slidably disposed upon said bolt, a nut upon the bolt, interlocking means between said nut and washer, and a locking pin engaging through alined openings in the washer as well as through the said slot in the bolt for preventing a reverse turning movement of said nut.

2. In an article of the class described, a bolt, a nut, said bolt being screw threaded at one end and formed with an elongated slot, inwardly projecting studs upon said nut, a washer loosely disposed upon the bolt and formed with sockets for the reception of nut studs, and a locking pin engaging through alined openings within said washer, as well as through the said slot in said bolt.

In testimony whereof I affix my signature.

GEORGE BERTHOLD.